United States Patent
Miyazaki

(10) Patent No.: US 9,254,020 B2
(45) Date of Patent: Feb. 9, 2016

(54) SLIDE FASTENER SLIDER

(71) Applicant: YKK Corporation, Tokyo (JP)

(72) Inventor: Yohei Miyazaki, Toyama (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 14/647,258

(22) PCT Filed: Nov. 26, 2012

(86) PCT No.: PCT/JP2012/080514
§ 371 (c)(1),
(2) Date: May 26, 2015

(87) PCT Pub. No.: WO2014/080532
PCT Pub. Date: May 30, 2014

(65) Prior Publication Data
US 2015/0313321 A1    Nov. 5, 2015

(51) Int. Cl.
*A44B 19/30* (2006.01)
*A44B 19/26* (2006.01)
*F16B 2/10* (2006.01)

(52) U.S. Cl.
CPC ................. *A44B 19/262* (2013.01); *F16B 2/10* (2013.01)

(58) Field of Classification Search
CPC .... A44B 19/308; A44B 19/26; A44B 19/262; A44B 19/306; A44B 19/30; Y10T 24/2586; Y10T 24/2568; Y10T 24/2566; Y10T 24/2571; Y10T 24/2577
USPC .......... 24/424, 421, 429, 418, 419, 420, 422, 24/423, 430
See application file for complete search history.

(56) References Cited

U.S. PATENT DOCUMENTS

| | | | |
|---|---|---|---|
| 5,664,300 A * | 9/1997 | Mizuno | A44B 19/308 24/421 |
| 7,870,650 B2 * | 1/2011 | Keyaki | A44B 19/26 24/421 |

(Continued)

FOREIGN PATENT DOCUMENTS

| | | |
|---|---|---|
| JP | 61-247402 A | 11/1986 |
| JP | 11-127918 A | 5/1999 |

(Continued)

OTHER PUBLICATIONS

International Search Report, PCT Application No. PCT/JP2012/080514, Feb. 12, 2013.

(Continued)

*Primary Examiner* — Robert J Sandy
*Assistant Examiner* — Rowland Do
(74) *Attorney, Agent, or Firm* — Kilpatrick Townsend & Stockton LLP

(57) ABSTRACT

There is provided a slider for slide fastener. A pull tab holder body includes flanges extending in a width direction and a longitudinal direction. A slider body includes slide groove portions formed in a front end portion of an upper blade to receive the flanges. One of the pull tab holder body and the slider body has a protrusion portion protruding toward the other. The other of the pull tab holder body and the slider body has a recess portion. The flanges are inserted into the slide groove portions and upper surface portions of the upper blade located above the slide groove portions are crimped toward the flanges, so that the protrusion portion is engaged with the recess portion and the pull tab holder body is fixed to the slider body.

8 Claims, 15 Drawing Sheets

(56) References Cited

U.S. PATENT DOCUMENTS

| | | | |
|---|---|---|---|
| 2008/0222854 A1 | 9/2008 | Keyaki et al. | |
| 2009/0313793 A1* | 12/2009 | Lin | A44B 19/26 24/429 |
| 2013/0174387 A1* | 7/2013 | Hamada | A44B 19/306 24/418 |
| 2013/0255042 A1* | 10/2013 | Keyaki | A44B 19/308 24/430 |
| 2014/0033484 A1* | 2/2014 | Hamada | A44B 19/26 24/418 |
| 2014/0041163 A1* | 2/2014 | Hamada | A44B 19/308 24/418 |

FOREIGN PATENT DOCUMENTS

| | | |
|---|---|---|
| JP | 2009-106611 A | 5/2009 |
| JP | 4799452 B2 | 10/2011 |

OTHER PUBLICATIONS

Written Opinion, PCT Application No. PCT/JP2012/080514, Feb. 12, 2013.

International Preliminary Report on Patentability, PCT Application No. PCT/JP2012/080514, Jun. 4, 2015.

* cited by examiner

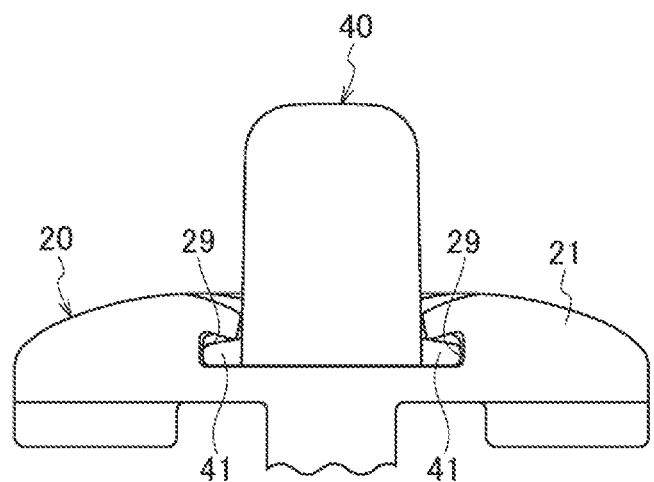
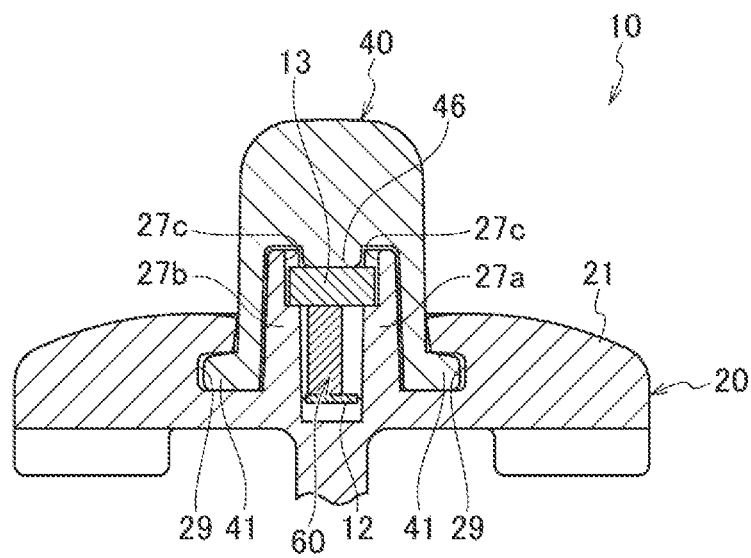
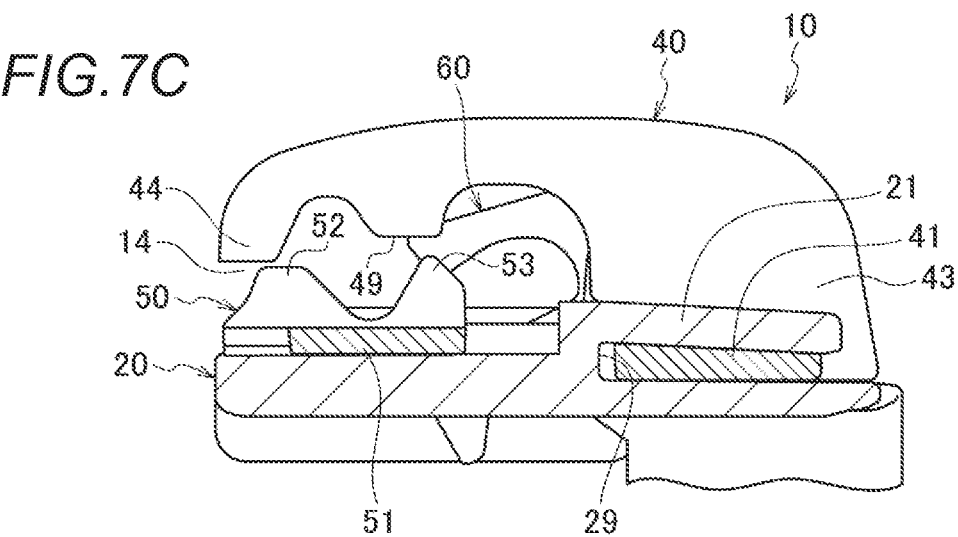

SLIDE FASTENER SLIDER

This application is a national stage application of PCT/JP2012/080514, which is incorporated herein by reference.

TECHNICAL FIELD

The present invention relates to a slider for slide fastener, and in particular to a slider for slide fastener, in which mount ability of a pull tab holder body on a slider body is significantly enhanced and thus product efficiency is increased.

BACKGROUND ART

Conventionally, crimping using a circular wire pin is employed as a structure of attaching a pull tab holder body to a slider body, but shaft holes need to be provided in the pull tab holder body and the slider body. Therefore, a slider for slide fastener is devised in which no circular wire pin is employed when attaching the pull tab holder body to the slider body, thereby enhancing productivity.

For example, in a slider for slide fastener described in Patent Document 1, flanges provided on a pull tab holder body are fitted into slide grooves of a slider body and then crimping pad portions provided on the slider body are crushed from the upper side thereof by a punch or the like so that the flanges of the pull tab holder body is crimped to an upper blade of the slider body, thereby allowing an operation of attaching the pull tab holder body to the slider body to be simply performed. Also, in a slider for slide fastener described in Patent Document 2, a part of side wall portions of a pull tab holder body is pressed toward a recess portion of a slider body and also raised portions formed on an upper blade are pressed toward a fixing recess portions provided on flanges of the pull tab holder body. In this way, the pull tab holder body is crimped and fixed to the slider body at two locations, thereby attempting to enhance attachment strength of the pull tab holder body to the slider body.

PRIOR ART DOCUMENT

Patent Document

Patent Document 1: Japanese Patent No. 4799452B
Patent Document 1: Japanese Patent Application Publication No. 2009-106611A

SUMMARY OF INVENTION

Problems to be Solved by Invention

However, in the slider for slide fastener described in Patent Document 1, the crimping pad portions need to be provided on the slider body and also there is a need for enhancing attachment strength of the pull tab holder body to the slider body. Also, in the slider for slide fastener described in Patent Document 2, because the pull tab holder body and the slider body are crimped at two locations, attachment strength thereof is enhanced, but crimping marks are left on side surfaces of the pull tab holder body. Also, because the fixing recess portions having a thin thickness are formed on the flanges, there is a problem in that processing thereof is complex.

The present invention has been made keeping in mind the above problems, and an object thereof is to provide a slider for slide fastener which can enhance workability when attaching a pull tab holder body to a slider body and has a strong attachment strength and a good appearance.

Means for Solving Problems

The object of the present invention is achieved by the following configurations.

(1) A slider for slide fastener, including:
a slider body having an upper blade and a lower blade arranged to face each other in an upward and downward direction and provided with an element guide passage between the upper blade and the lower blade;
a pull tab having an attachment shaft portion; and
a pull tab holder body fixed, at one end portion thereof, to the upper blade of the slider body in cantilevered fashion and configured to hold the attachment shaft portion of the pull tab,
wherein the pull tab holder body includes flanges extending from right and left side surfaces of the one end portion in a width direction and also extending in a longitudinal direction,
wherein the slider body includes slide groove portions formed in a front end portion of the upper blade and configured to receive the flanges,
wherein one of the pull tab holder body and the slider body has a protrusion portion protruding toward the other of the pull tab holder body and the slider body,
wherein the other of the pull tab holder body and the slider body has a recess portion to be engaged with the protrusion portion, and
wherein the flanges are inserted into the slide groove portions and upper surface portions of the upper blade located above the slide groove portions are crimped toward the flanges, so that the protrusion portion is engaged with the recess portion and the pull tab holder body is fixed to the slider body.

(2) The slider for slide fastener according to (1), wherein upper surfaces of the flanges are inclined surfaces, which are inclined so that a thickness of each of the flanges is gradually decreased from rear end portions of the flanges toward front end portions thereof (3) The slider for slide fastener according to (1) or (2), wherein upper surfaces of the flanges are formed so that a thickness of each of the flanges is gradually decreased from base portions of the flanges toward side surfaces thereof, and
wherein upper surfaces of the slide groove portions of the slider body are formed to correspond to the upper surfaces of the flanges so that a thickness of each of the upper surface portions of the upper blade, which are located above the slide groove portions, is gradually decreased from base portions of the upper surface portions toward side surfaces.

(4) The slider for slide fastener according to any one of (1) to (3), wherein side surfaces of the flanges are inclined so that a width of each of the flanges is gradually widened from rear end portions of the flanges toward the front end portions thereof (5) The slider for slide fastener according to any one of (1) to (4),
wherein the protrusion portion is formed to protrude from a lower surface of the one end portion of the pull tab holder body toward the slider body, and
wherein the recess portion is formed in an upper surface of the front end portion of the upper blade.

(6) The slider for slide fastener according to any one of (1) to (4),
wherein the protrusion portion is formed to protrude from an upper surface of the front end portion of the upper blade toward the pull tab holder body, and wherein the recess portion is formed in a lower surface of the one end portion of the pull tab holder body.

(7) The slider for slide fastener according to any one of (1) to (4), wherein the protrusion portion is formed on lower surfaces of the flanges of the pull tab holder body, and wherein the recess portion is formed in lower surfaces of the slide groove portions.

(8) The slider for slide fastener according to any one of (1) to (4), further including:

a stop claw body arranged in an upward and downward swingable manner by a claw body support portion, which is erected from the upper blade, and having a claw portion capable of retractably protruding to the element guide passage through a claw hole formed in the upper blade; and a pivot pin having both ends held in support grooves formed in the claw body support portion and configured to pivotally support the stop claw body, wherein the protrusion portion is a step portion formed to protrude downward from a lower surface of an inner wall of the pull tab holder body and configured to be abutted against the pivot pin, and wherein the recess portion is the support grooves configured to hold the both ends of the pivot pin and to be engaged with the step portion.

Advantageous Effects of Invention

According to the slider for slide fastener of the present invention, the pull tab holder body includes the flanges extending from right and left side surfaces of the one end portion in a width direction and also extending in a longitudinal direction, and the slider body includes the slide groove portions formed in a front end portion of the upper blade and configured to receive the flanges. Also, one of the pull tab holder body and the slider body has the protrusion portion protruding toward the other of the pull tab holder body and the slider body and the other of the pull tab holder body and the slider body has a recess portion to be engaged with the protrusion portion. Further, the flanges are inserted into the slide groove portions and the upper surface portions of the upper blade located above the slide groove portions are crimped toward the flanges, so that the protrusion portion is engaged with the recess portion and thus the pull tab holder body is fixed to the slider body. Accordingly, attachment of the pull tab holder body to the slider body can be facilitated, thereby enhancing productivity. In addition, because the flanges are inserted into the slide groove portions and the upper surface portions of the upper blade are crimped toward the flanges, the pull tab holder body and the slider body are fixed to each other in the upward and downward direction by crimping and also the pull tab holder body and the slider body are fixed to each other in the forward and rearward direction by engagement of the protrusion portion with the recess portion. In addition, attachment strength can be increased because the whole of the flanges is crimped, and also appearance can be enhanced because no crimping mark is left on the pull tab holder body.

BRIEF DESCRIPTION OF DRAWINGS

FIG. 7A is a front view of the main part showing a state of the pull tab holder body and the slider body after crimping, FIG. 7B is a sectional view of a main part taken along a line C-C in FIG. 2, FIG. 7C is a sectional view of a main part taken along the line B-B in FIG. 2.

EMBODIMENTS OF INVENTION

One embodiment of a slider for slide fastener according to the present invention will be described with reference to the accompanying drawings. Meanwhile, in the following description, a side, from which fastener elements are disengaged and come out, corresponding to a wider side of a slider is referred to as a shoulder mouth side, and also a side, from which the fastener elements are engaged and come out, corresponding to a narrower side of the slider is referred to as a rear mouth side. In addition, the shoulder mouth side is referred to as a front side, the rear mouth side is referred to as a rear side, a sliding direction of the slider is referred to as a forward and rearward direction, a direction perpendicular to the forward and rearward direction and also parallel to fastener tapes, not shown, is referred to as a right and left direction (width direction), and a direction perpendicular to the forward and rearward direction and the right and left direction is referred to as an upward and downward direction.

Figure 1:
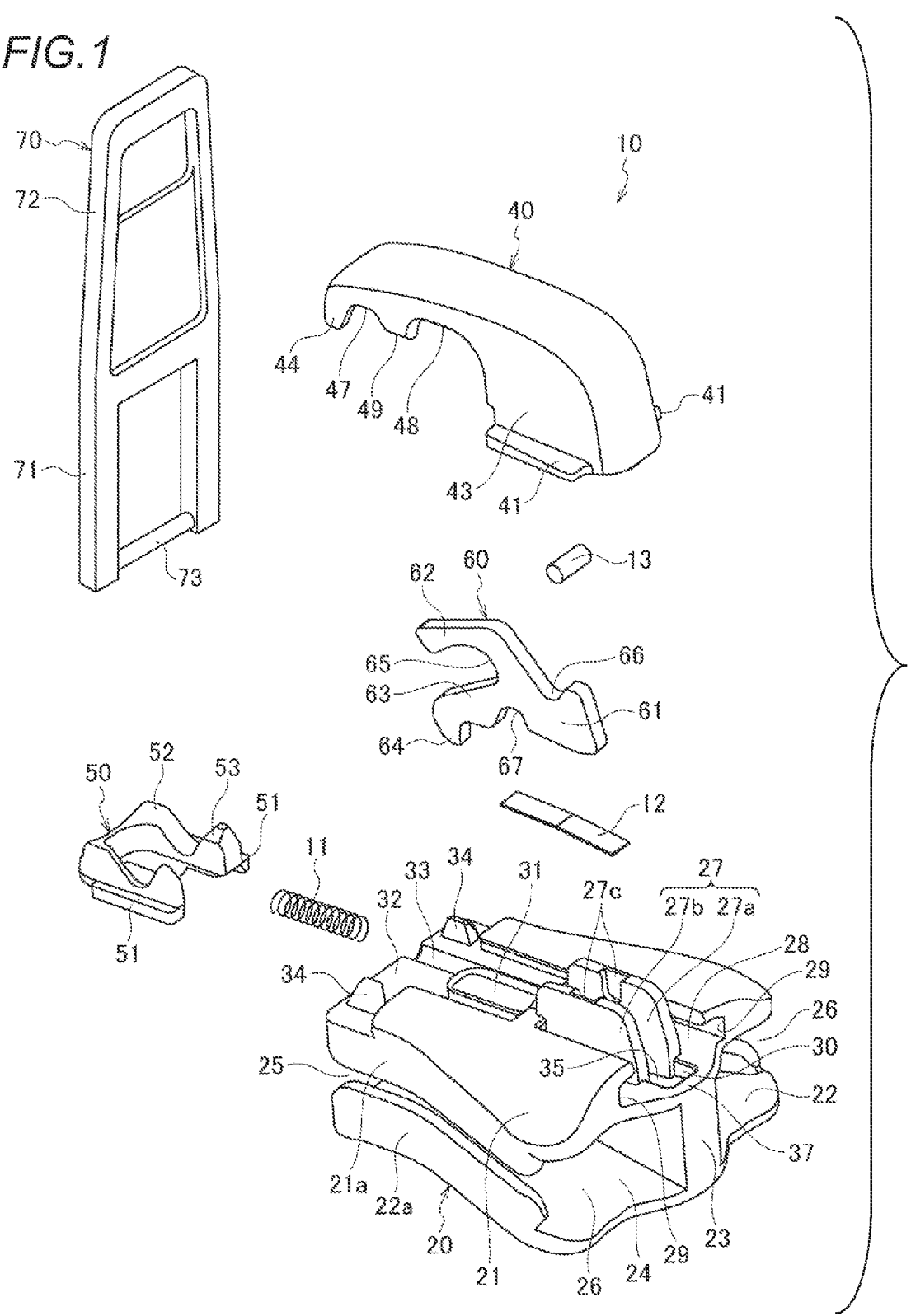
FIG. 1 is an exploded perspective view of a slider for slide fastener according to a first embodiment of the present invention.
Figure 2:
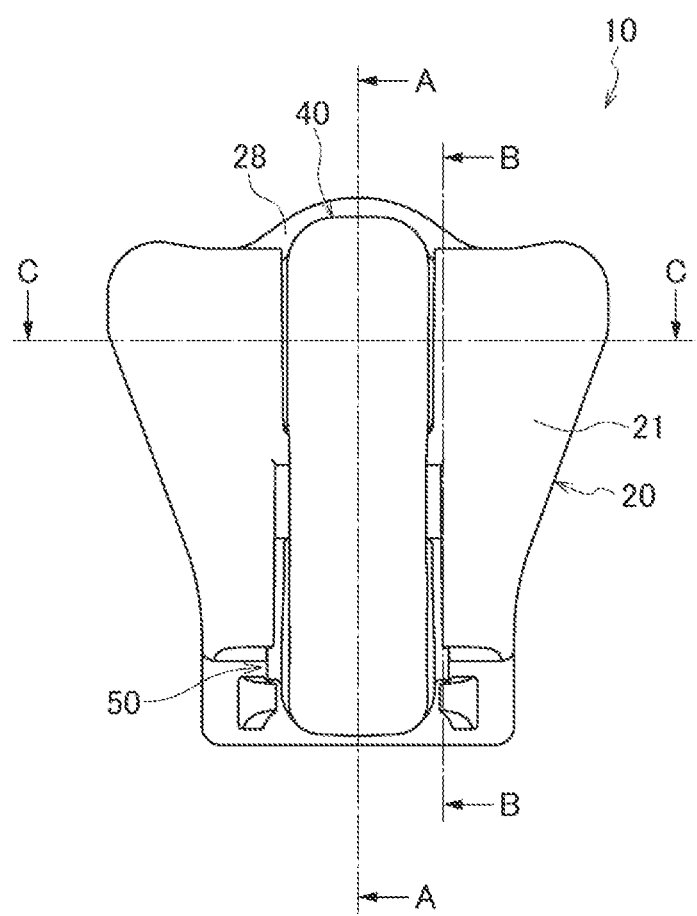
FIG. 2 is a front view of the slider for slide fastener shown in FIG. 1.

As shown in FIGS. 1 and 2, a slider for slide fastener according to the present embodiment is generally constituted of a slider body 20, a pull tab holder body 40, an opening and closing member 50, a stop claw body 60, and a pull tab 70. The pull tab holder body 40 and the stop claw body 60 are manufactured by pressing or die-casting a metal material, such as stainless steel, cooper alloy or aluminum alloy, and the slider body 20 and the opening and closing member 50 are manufactured by pressing or die-casting a metal material, such as aluminum alloy or zinc alloy. Meanwhile, in the embodiment, the pull tab holder body 40, the slider body 20, and the opening and closing member 50 are composed of zinc die-cast and the stop claw body 60 is composed of cooper alloy. Also, these components may be manufactured by injection molding a thermoplastic resin material, such as polyamide, polypropylene, ployacetal or polybutylene terephthalate, instead of metal materials as described above.

Figure 5A:
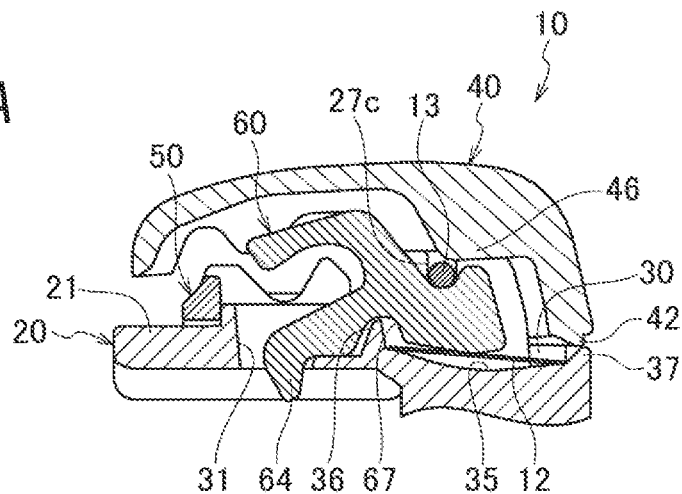
FIG. 5A is a sectional view of a main part taken along the line A-A in FIG. 2, showing a state of the slider body and the pull tab holder body during mounting.

As shown in FIGS. 1 and 2, the slider body 20 has an upper blade 21, a lower blade 22 and a guide post 23 configured to connect front end portions of the upper blade 21 and the lower blade 22 with each other, and is formed as a unity. On right and left side portions of the upper blade 21 and the lower blade 22, upper and lower flanges 21a and 22a are respectively provided to extend from rear ends thereof to the generally middle positions. The slider body 20 has a Y-shaped element guide passage 24 formed between the upper blade 21 and the lower blade 22 and is provided with a rear mouth 25 on a rear end of the element guide passage 24 and two shoulder mouths 26 on a front end thereof The slider body 20 is provided, on a front portion of an upper surface of the upper blade 21, with a claw body support portion 27 which is constituted of right and left wall portions 27a and 27b erected therefrom and spaced from each other by a distance allowing the stop claw body 60 to be received therebetween. On inner wall surfaces of the right and left wall portions 27a and 27b, U-shaped grooves 27c for holding a pivot pin 13, which is configured to pivotally support the stop claw body 60 in an upward and downward swingable manner, are respectively formed to be opened upward. Also, a spring chamber 35 for receiving a leaf spring 12 as described below is provided between the right and left wall portions 27a and 27b on the upper surfaces of the upper blade 21. In addition, a positioning protrusion portion 36 for positioning the stop claw body 60 is formed on a rear end side of the spring chamber 35 (see FIG. 5A).

The slider body 20 includes a fitting portion 28 recessedly provided on a more front end side of the upper blade 21 than the claw body support portion 27, and slide groove portions 29 linearly recessedly provided on both right and left sides of the fitting portion 28 to extend from the front end of the upper blade 21 to rear sides of the right and left wall portions 27a and 27b of the claw body support portion 27 along a longitudinal direction of the slider body 20. The slide groove portions 29 are configured to receive flanges 41 of the pull tab holder body 40 as described below.

Also, in the widthwise middle portion of the fitting portion 28, a recess portion 30 configured to be engageable with a protrusion portion 42 of the pull tab holder body 40 as described below is formed on a more front end side thereof than the claw body support portion 27. The recess portion 30 is formed to be continued from the spring chamber 35 formed between the right and left wall portions 27a and 27b of the claw body support portion 27.

The slider body 20 has, on a rear side of the claw body support portion 27, a claw hole 31 formed to extend from the upper surface of the upper blade 21 to the element guide passage 24. On the upper surface of the upper blade 21, an opening and closing member guide groove 32, in which the opening and closing member 50 is to be slidably fitted, is formed to extend from the rear end of the upper blade 21 to right and left sides of the claw hole 31.

Also, a spring mounting groove 33 for mounting a coil spring 11 therein is formed in a part of a bottom surface of the opening and closing member guide groove 32. Further, on the rear end portion of the upper blade 21, protruding piece portions 34 are provided, on both right and left sides thereof, to protrude from a bottom surface of the opening and closing member guide groove 32. After the opening and closing member 50 is fitted in the opening and closing member guide groove 32, the protruding piece portions 34 are pushed and bent toward the widthwise middle portion of the slider body 20, so that the protruding pieces portions 34 serve as a stopper for preventing the opening and closing member 50 from being removed from the opening and closing member guide groove 32.

As shown in FIGS. 3A to 3E, the pull tab holder body 40 is formed in a bottomed box shape, which has an opening in one surface thereof and is generally L-shaped as viewed from the side, and is attached to the slider body 20 in cantilevered fashion in such a manner that a fixed base end portion 43, which is one end of the pull tab holder body 40, is fixed on the front portion of the upper surface of the upper blade 21. Thus, a gap 14 is formed between a rear end portion 44 of the pull tab holder body 40, which is the other end thereof, and the slider body 20 (see FIG. 6B).

Figure 3A:
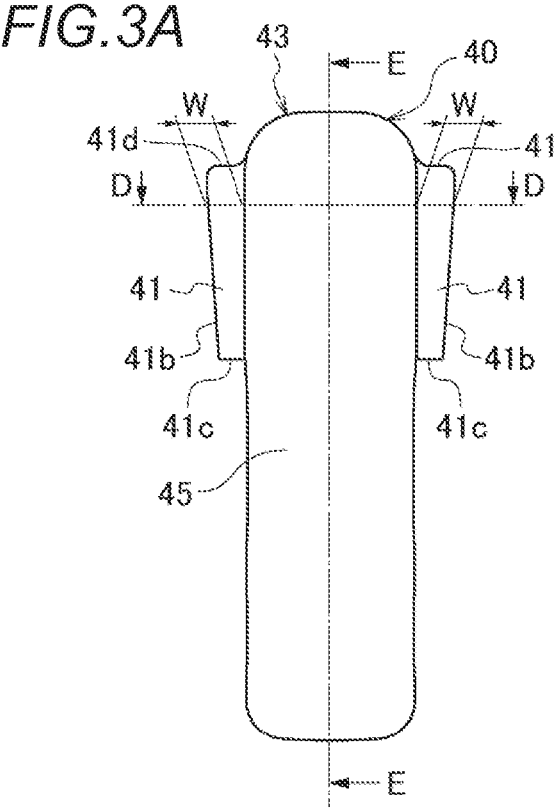
FIG. 3A is an elevation view of a pull tab holder body shown in FIG. 1.
Figure 3B:
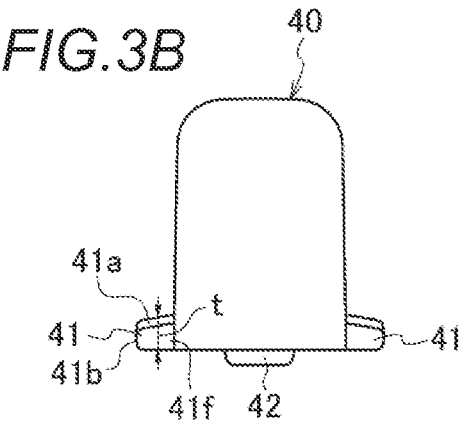
FIG. 3B is a front view of the pull tab holder body.
Figure 3C:
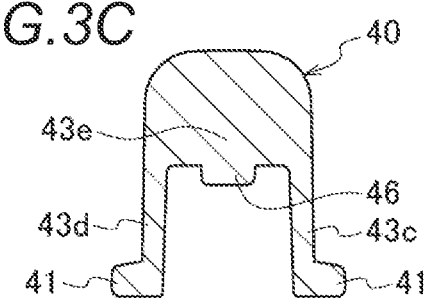
FIG. 3C is a sectional view taken along a line D-D in FIG. 3A.
Figure 3D:
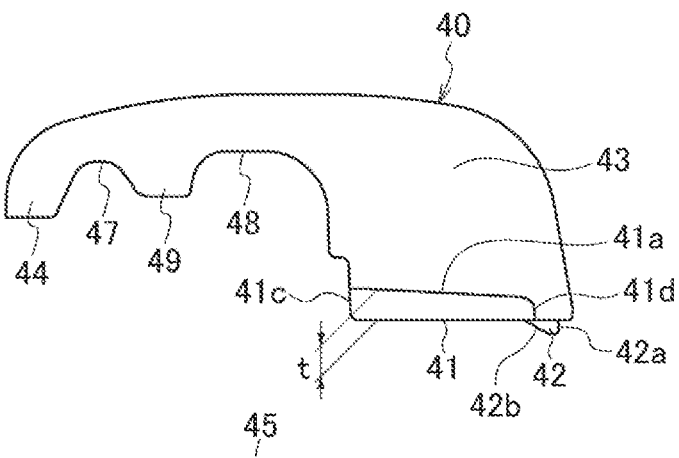
FIG. 3D is a side view of the pull tab holder body.
Figure 3E:
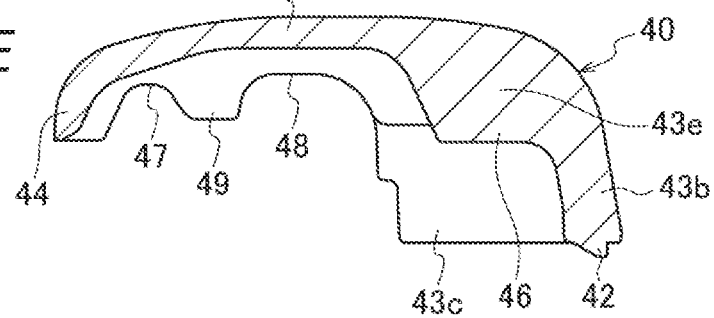
FIG. 3E is a sectional view taken along a line E-E in FIG. 3A.

On lower edge portions of both right and left surfaces of the fixed base end portion 43 of the pull tab holder body 40, a pair of right and left flanges 41 are formed to be received into the slide groove portions 29 of the slider body 20. As shown in FIG. 3D, upper surfaces 41a of the flanges 41 are formed into inclined surfaces, which are configured so that a thickness t of each of the flanges 41 is gradually decreased from rear end portions 41c of the flanges 41 toward front end portions 41d thereof. Also, as shown in FIG. 3B, the upper surfaces 41a of the flanges 41 are formed into inclined surfaces, which are inclined so that the thickness t of the flanges 41 is gradually decreased from base portions 41f of the flanges 41 toward side surfaces 41b thereof. In addition, as shown in FIG. 3A, both side surfaces 41b of the flanges 41 are formed to be inclined so that a width W thereof is gradually widened from the rear end portions 41c of the flanges 41 toward the front end portions 41d.

Figure 4A:
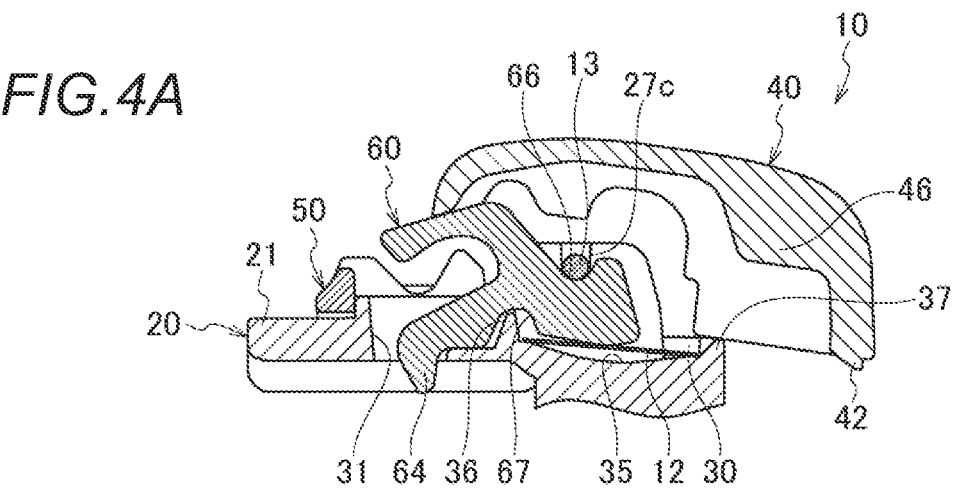
FIG. 4A is a sectional view of a main part taken along a line A-A in FIG. 2, showing a state of a slider body and the pull tab holder body at starting of mounting.
Figure 4B:
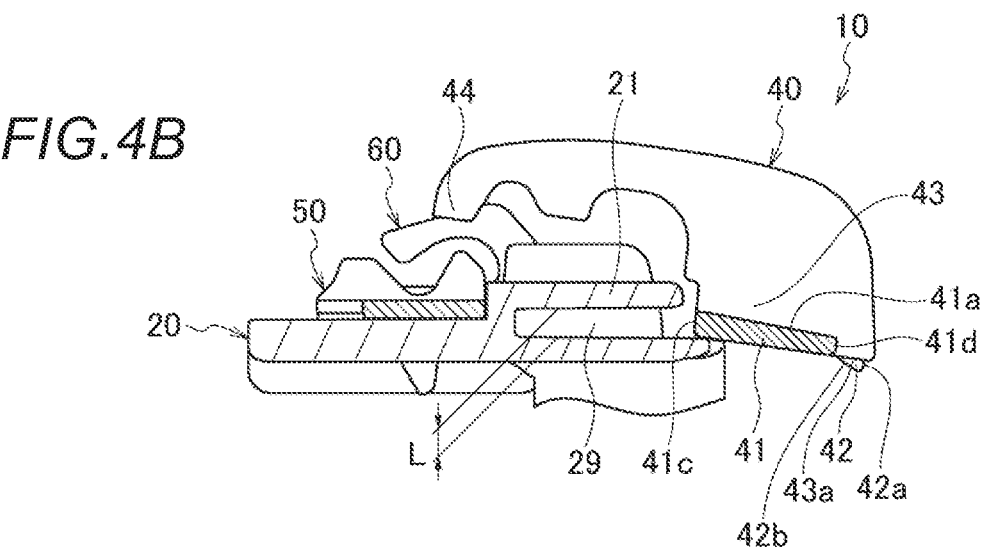
FIG. 4B is a sectional view of a main part taken along a line B-B in FIG. 2.
Figure 6A:
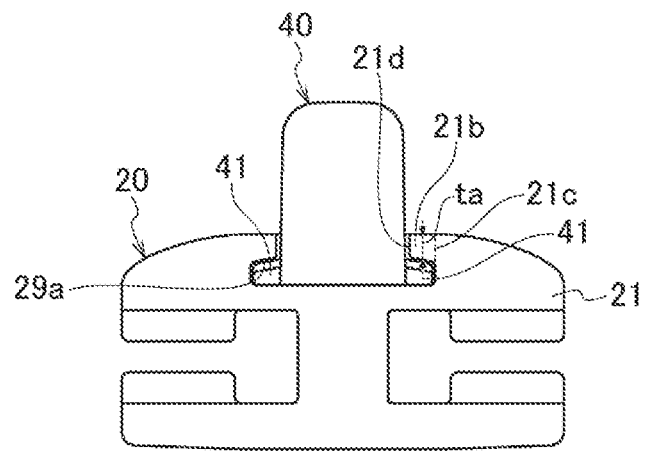
FIG. 6A is a front view showing a state where the pull tab holder body has been mounted on the slider body but is not yet crimped.

Meanwhile, in the present embodiment, the groove height L of the slide groove portions 29, which are intended to receive the flanges 41, before crimping are formed to be uniform along a forward and rearward direction thereof as shown in FIG. 4B. Also, as shown in FIG. 6A, upper surfaces 29a of the slide groove portions 29 of the slider body 20 are inclined to correspond to the upper surfaces 41a of the flanges 41 so that a thickness to of each of upper surface portions 21b of the upper blade 21, which are located above the slide groove portions 29, is gradually decreased from base portions 21c of the upper surface portions 21b toward side surfaces 21d.

Also, the pull tab holder body 40 is provided with a generally triangular cross-sectioned protrusion portion 43 protruding downward from a lower surface 43a of a front end portion side of the fixed base end portion 43. A front end wall 42a of the protrusion portion 42 is formed at a generally right angle relative to the lower surface 43a and a rear end wall 42b thereof is formed to be inclined relative to the lower surface 43a. Also, the fixed base end portion 43 is formed to cover the claw body support portion 27 of the slider body 20 by an upper surface portion 45 extending to a rear end portion 44 thereof, a front wall portion 43b continuously extending forward from the upper surface portion 45 and right and left side wall portions 43c and 43d, and in a region surrounded by the upper surface portion 45, the front wall portion 43b and the right and left side wall portions 43c and 43d, a bulged portion 43e formed by bulging an inner wall thereof downward is provided. Also, on a lower surface of the bulged portion 43e, as shown in FIG. 3C, a step portion 46 protruding downward from the middle thereof in a right and left direction is provided.

In addition, on right and left surface portions of the pull tab holder body 40 at the rear end portion 44 thereof, retracting portions 47 and receiving portions 48 are formed in a recessed shape oriented downward to face the slider body 20, and convex-shaped continuous edge portions 49 are continued between the retracting portions 47 and the receiving portions 48.

Returning to FIG. 1, the opening and closing member 50 is formed in a generally U shape as viewed from the top, thereby prevention interference thereof with the claw hole 31 when the opening and closing member 50 is attached to the upper blade 21 (opening and closing member guide groove 32) of the slider body 20 and then is slid toward the front end side thereof. The opening and closing member 50 is provided, on lower portions of right and left edge portions thereof, with guide portions 51, which are configured to be slidably fitted into the opening and closing member guide groove 32 of the upper blade 21. Also, on bifurcated arm portions of the opening and closing member 50, base end-side closing portions 52 and distal end-side closing portions 53 are formed in a convex shape oriented upward.

The stop claw body 60 includes a claw body base end portion 61 and an upper arm portion 62 and a lower arm portion 63 bifurcated from the claw body base end portion 61 to extend in generally parallel to each other, and on a distal end of the lower arm portion 63, has a claw portion 64 formed to protrude to the element guide passage 24 through the claw hole 31. Also, a recessed operation groove 65 is provided between the upper and lower arm portions 62 and 63 to be opened toward the rear mouth 25 side of the slider body 20. A pivotal recess portion 66 is formed on an upper portion of the claw body base end portion 61 to be pivoted about the pivot pin 13, of which both ends are held in the U-shaped grooves 27c of the claw body support portion 27, and a lower recess portion 67 is provided on a lower portion of the claw body base end portion 61.

The pull tab 70 has an annular portion 71, into which the pull tab holder body 40 is to be inserted, on one end side thereof and a handle portion 72 extending from the annular portion 71 to the other end side. An attachment shaft portion 73 having a circular cross section is arranged on a distal end portion of the annular portion 71. A length of the attachment shaft portion 73 is set to be larger than a width dimension of the pull tab holder body 40.

Next, mounting of the slide fastener slide 10 according to the present embodiment will be described with reference to FIGS. 4A to 7C.

First, the opening and closing member 50 and the coil spring 11 are mounted on the slider body 20. Specifically, the coil spring 11 is mounted in the spring mounting groove 33 formed in the upper blade 21 of the slider body 20 and then the guide portion 51 of the opening and closing member 50 is fitted and inserted into the opening and closing member guide groove 32 of the upper blade 21. Then, in a state where the opening and closing member 50 is pushed and thus the coil spring 11 is contracted, the protruding piece portions 34 provided on both sides of the opening and closing member guide groove 32 are pushed and bent toward the widthwise middle portion of the slider body 20. Thus, the opening and closing member 50 and the coil spring 11 are prevented from being removed from the upper blade 21 of the slider body 20. The opening and closing member 50 is attached to the slider body 20 to be slidable along the opening and closing member 32 in a state where the opening and closing member 50 is always urged by an elastic force of the coil spring 11.

Subsequently, on the slider body 20 on which the opening and closing member 50 and the coil spring 11 are mounted, the leaf spring 12, the stop claw body 60, the pivot pin 13 and the pull tab holder body 40 are mounted in this order. Specifically, as shown in FIG. 4A, the leaf spring 12, which is formed in a rectangular shape by a spring steel plate, is inserted into the spring chamber 35 provided between the right and left wall portions 27a and 27b of the claw body support portion 27, and then the stop claw body 60 is inserted between the right and left wall portions 27a and 27b from the upper side thereof, while engaging the lower recess portion 67 of the stop claw body 60 with the positioning protrusion portion 36. In addition, the pivot pin 13 is fitted into the U-shaped grooves 27c of the claw body support portion 27 and then is placed on the pivot recess portion 66 of the stop claw body 60.

Meanwhile, in order to prevent the components from being removed even if the pull tab holder body 40 comes in contact therewith when the pull tab holder body 40 is mounted, the leaf spring 12 and the pivot pin 13 are preferably crimped and fixed to the claw body support portion 27.

Figure 5B:
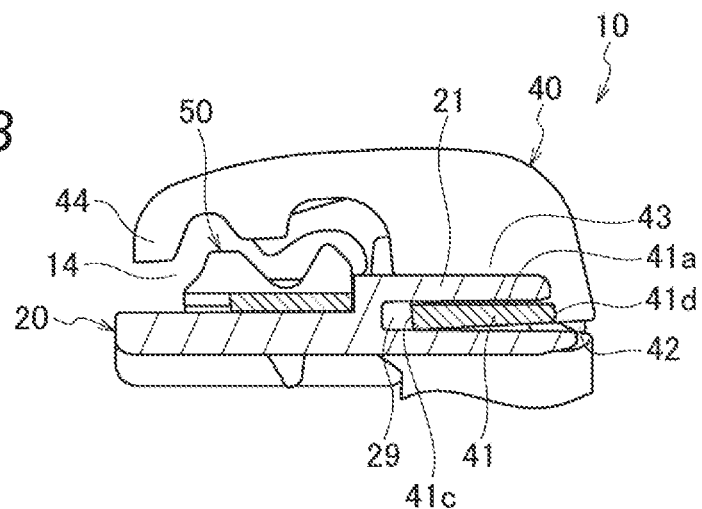
FIG. 5B is a sectional view of a main part taken along the line B-B in FIG. 2.

Subsequently, as shown in FIG. 4B, the flanges 41 of the pull tab holder body 40 are inserted into the slide groove portions 29 from the front end of the slider body 20, and also as shown in FIG. 5B, the pull tab holder body 40 is slid along the slide groove portions 29 toward the rear side of the slider body 20.

At this time, the upper surfaces 41a of the flanges 41 are inclined so that the thickness t of the flanges 41 is gradually decreased from the rear end portions 41c of the flanges 41 toward the front end portions 41d, whereas the groove height L of the slide groove portions 29 are formed to be uniform along the forward and rearward direction. Accordingly, gaps between the flanges 41 and the slide groove portions 29 in the upward and downward direction are larger on the front end portions 41d side of the flanges 41 than that on the rear end portions 41c side. Thus, the pull tab holder body 40 can be tilted so that the front end portions 41d are lifted upward (see FIG. 5B), thereby preventing interference between the protrusion portion 42 and the wall 37 of the slider body 20 when the pull tab holder body 40 is slid toward the rear side of the slider body 20.

Also, the rear end wall 42b of the protrusion portion 42 is inclined relative to the lower surface 43a of the fixed base end portion 43, and thus as shown in FIG. 5B, as the protrusion portion 42 is guided by the wall 37 of the slider body 20, the pull tab holder body 40 is gradually tilted in a counter-clock wise and also is slid toward the rear side of the slider body 20. Then, the protrusion portion 42 is climbed over the wall 37 of the slider body 20 and thus is engaged with the recess portion 30 (see FIG. 6A).

Then, as shown in FIGS. 7A to 7C, the upper surface portions 21b of the upper blade 21 located above the slide groove portions 29 of the slider body 20 is crushed toward the flanges 41 by a punch or the like, so that the flanges 41 of the pull tab holder body 40 are crimped and fixed to the upper blade 21. Thus, because the protrusion portion 42 and the recess portion 30 are engaged with each other and also the flanges 41 are crimped by the upper blade 21, the pull tab holder body 40 is firmly fixed to the slider body 20 by a combination of both engagement and crimping.

Also, because both side surfaces 41b of the flanges 41 are inclined in the forward and rearward direction (see FIG. 3A) so that the width W of the flanges 41 is gradually widened toward the front end portion of the slider body 20, contact areas of the crimped portions are increased, thereby enhancing crimping strength. In addition, because the front end wall 42a of the protrusion portion 42 is formed to be perpendicular to the lower surface 43a, engagement thereof with the recess portion 30 is securely kept against a forward force to be exerted on the pull tab holder body 40.

Figure 6B:
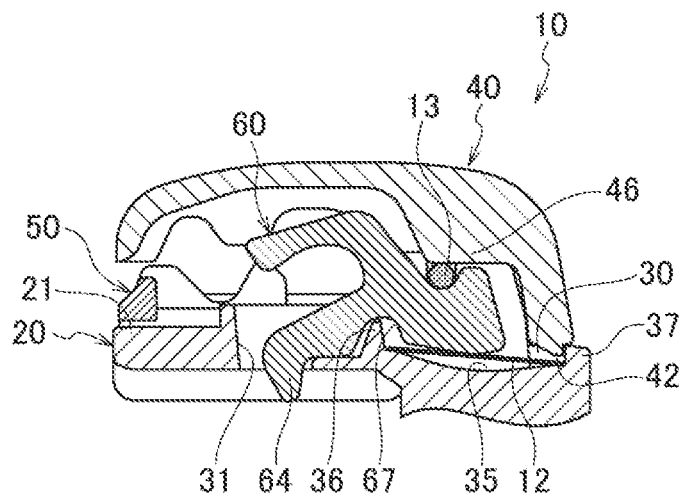
FIG. 6B is a sectional view of a main part taken along the line A-A in FIG. 2.
Figure 6C:
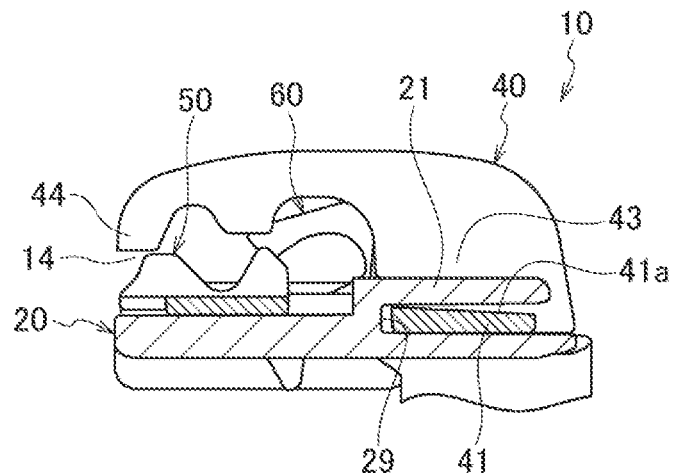
FIG. 6C is a sectional view of a main part taken along the line B-B in FIG. 2.

Also, as shown in FIGS. 6B and 7B, the step portion 46 of the pull tab holder body 40 is abutted against the pivot pin 13 and thus presses the pivot pin 13, which is fitted in the U-shaped grooves 27c of the claw body support portion 27, from the upper side thereof, thereby enhancing attachment strength of the pivot pin 13. Thus, the stop claw body 60 is supported to be swingable about the pivot pin 13. Also, the stop claw body 60 is pivoted in a counter-clock wise in FIG. 6B because the more front end side thereof than the pivot pin 13 is urged upward by an elastic force of the leaf spring 12. Accordingly, the claw portion 64 of the stop claw body 50 protrudes from the claw hole 31 into the element guide passage 24 and is engaged with fastener elements, not shown.

Meanwhile, as shown in FIGS. 7A to 7C, the opening and closing member 50 is always urged rearward by the coil spring 11. Accordingly, the gap 14 formed between the rear end portion 44 of the pull tab holder body 40 and the upper blade 21 of the slider body 20 is closed by the base end-side closing portions 52 of the opening and closing member 50, and also gaps formed between the continuous edge portions 49 of the pull tab holder body 40 and the upper blade 21 are closed by the distal end-side closing portions 53 of the opening and closing member 50.

In order to attach the pull tab to the slider 10 for slide fastener mounted as described above, the attachment shaft portion 73 of the pull tab 70 is pushed and inserted into the gap 14 from the rear end side of the slider 10 for slide fastener. Thus, the opening and closing member 50 is slidingly moved forward along the opening and closing member guide groove 32 of the upper blade 21 against the urging force of the coil spring 11. Then, the attachment shaft portion 73 of the pull tab 70 is inserted through the gap 14 and thus the pull tab 70 is mounted.

As described above, according to the slider 10 for slide fastener of the present embodiment, the pull tab holder body 40 includes the flanges 41 extending from right and left side surfaces of the fixed base end portion 43 in the width direction and also extending in the longitudinal direction, and the protrusion portion 42 protruding toward the slider body 20. Also, the slider body 20 includes the slide groove portions 29 formed in the front end portion of the upper blade 21 and configured to receive the flanges 41, and the recess portion 30 configured to be engaged with the protrusion portion 42. Further, the flanges 41 are inserted into the slide groove portions 29 and then the upper surface portions 21b of the upper blade 21 located above the slide groove portions 29 are crimped toward the flanges 41 so that the protrusion portion 42 is engaged with the recess portion 30 and thus the pull tab holder body 40 is fixed to the slider body 20. Accordingly, attachment of the pull tab holder body 40 to the slider body 20 can be facilitated, thereby enhancing productivity. In addition, because the flanges 41 are inserted into the slide groove portions 29 and then the upper surface portions 21b of the upper blade 21 are crimped toward the flanges 41, the pull tab holder body 40 and the slider body 30 are fixed to each other in the upward and downward direction by crimping and also the pull tab holder body 40 and the slider body 20 are fixed to each other in the forward and rearward direction by engagement of the protrusion portion 42 with the recess portion 30. In addition, attachment strength can be increased because the whole of the flanges 41 is crimped, and also appearance can be enhanced because no crimping mark is left on the pull tab holder body 40.

Also, the upper surfaces 41a of the flanges 41 are inclined surfaces configured so that the thickness t of the flanges 41 is gradually decreased from the rear end portions 41c of the flanges 41 toward the front end portions 41d thereof. Accordingly, the protrusion portion 42 can be smoothly engaged with the recess portion 30 by tilting the pull tab holder body 40 when the flanges 41 of the pull tab holder body 40 are inserted into the slide groove portions 29 of the slider body 20. Also, the thickness t of the rear end portions 41c of the flanges 41, on which a force is likely to be concentrated when an external force is exerted on the pull tab holder body 40, can be increased, thereby enhancing strength.

Further, the side surfaces 41b of the flanges 41 are inclined so that the width W of the flanges 41 is gradually widened from the rear end portions 41c of the flanges 41 toward the front end portions 41d. Accordingly, when the upper surface portions 21b of the upper blade 21 are crimped toward the flanges 41, contact areas between the crimped portions of the slider body 20 and the flanges 41 can be increased, thereby enhancing attachment strength. Also, the flanges 41 of the pull tab holder body 40 can be easily inserted into the slide groove portions 29 of the slider body 20.

In addition, the protrusion portion 42 is formed to protrude from the lower surface of the fixed base end portion 43 of the pull tab holder body 40 toward the slider body 20, and also the recess portion 30 is formed in the front end portion side of the upper blade 21. Accordingly, by engaging the protrusion portion 42 with the recess portion 30, the pull tab holder body 40 and the slider body 20 can be fixed to each other in the forward and rearward direction, thereby enhancing attachment strength.

Meanwhile, the present invention is not limited to those that were illustrated in the foregoing embodiment but can be suitably changed without departing from the concept of the invention.

For example, although in the foregoing embodiment, the flanges 41 have upper surfaces 41a inclined so that the thickness t thereof is gradually decreased from the rear end portions 41c toward the front end portions 41d, the present invention is not limited to that.

Figure 8A:
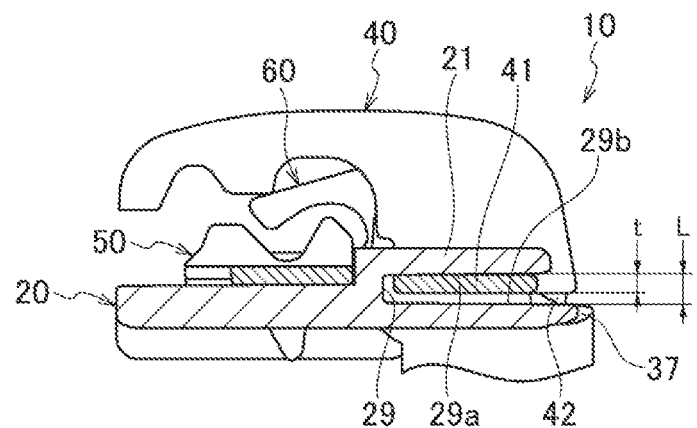
FIGS. 8A to 8C are sectional views showing a main part of a slider for slide fastener of a first variant along a mounting order.
Figure 8B:
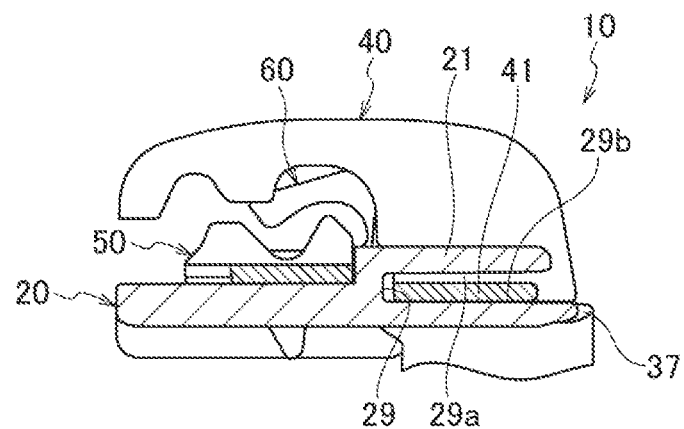
Figure 8C:
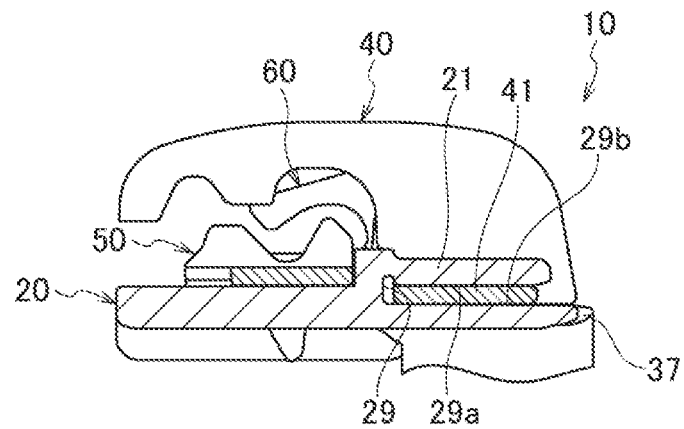

For example, as shown in FIGS. 8A to 8C, in a slider for slide fastener according to a first variant, flanges 41 are formed so that a thickness t thereof are uniform from rear end portions 41c to front end portions 41d. Contrarily, slide groove portions 29 of the slider body 20, like that of the first embodiment, are formed so that a groove height L thereof are slightly larger than the total dimension of the thickness t of the flanges 41 and a protruding height of the protrusion portion 42 of the pull tab holder body 40 and also are uniform along the forward and rearward direction.

Figure 9A:
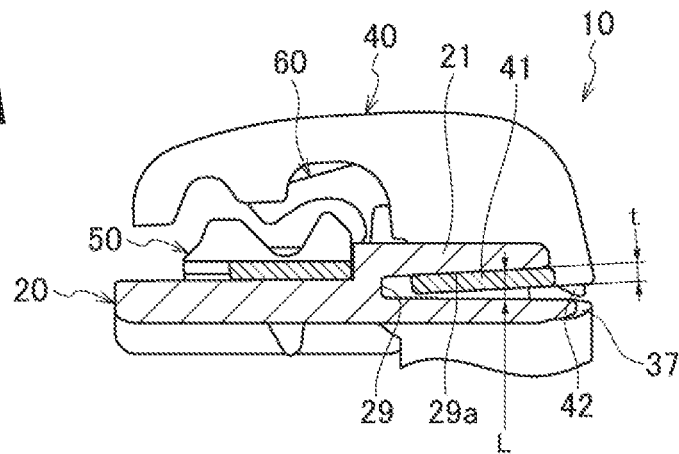
FIGS. 9A to 9C are sectional views showing a main part of a slider for slide fastener of a second variant along a mounting order.
Figure 9B:
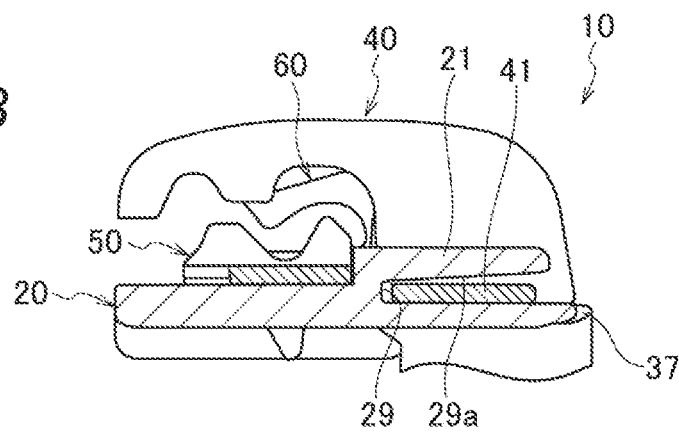
Figure 9C:
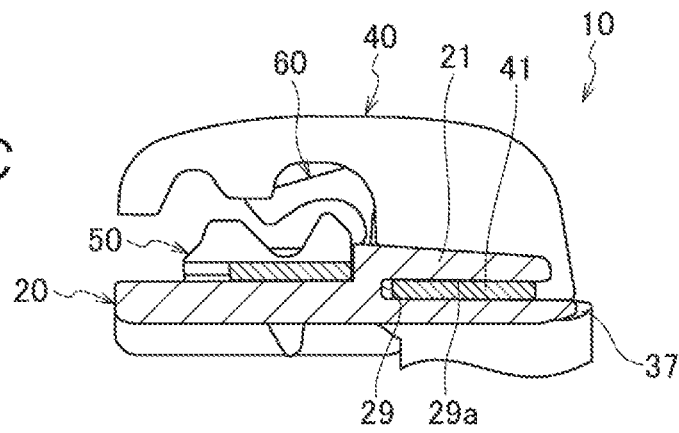

Alternatively, as shown in FIGS. 9A to 9C, in a slider for slide fastener according to a second variant, flanges 41 are formed so that a thickness t thereof are uniform from rear end portions 41c to front end portions 41d. In addition, slide groove portions 29 of the slider body 20 have upper surfaces 29a inclined so that a groove height L thereof is gradually increased from the lengthwise middle portion of the slider body 20 toward the front end portion thereof, and also formed so that a groove height L at the front end portion is slightly larger than the total dimension of the thickness t of the flanges 41 and a protruding height of the protrusion portion 42 of the pull tab holder body 40.

Thus, in order to mount the pull tab holder body 40 on the slider body 20 in the first and second variants, as shown in FIGS. 8A and 9A, the flanges 41 of the pull tab holder body 40 is inserted along the slide groove portions 29 and also the protrusion portion 42 is guided by the wall 37 of the slider body 20. Then, as shown in FIGS. 8B and 9B, the protrusion portion 42 is engaged with the recess portion 30 of the slider body 20 and the pull tab holder body 40 is descended so that the flanges 41 are abutted against the lower surfaces 29b of the slide groove portions 29. In addition, as shown in FIGS. 8C and 9C, the upper surface portions 21b of the upper blade 21 located above the slide groove portions 29 is crushed from the upper side thereof by a punch or the like, so that the flanges 41 are crimped and fixed to the upper blade 21.

Meanwhile, the other configurations are the same as those of the slider 10 for slide fastener of the foregoing embodiment.

Further, although in the foregoing embodiment, the protrusion portion 42 is formed to protrude from the lower surface of one end portion of the pull tab holder body 40 and the recess portion 30 is formed on the upper surface of the front end portion of the upper blade 21, the present invention is not limited to that.

Figure 10:
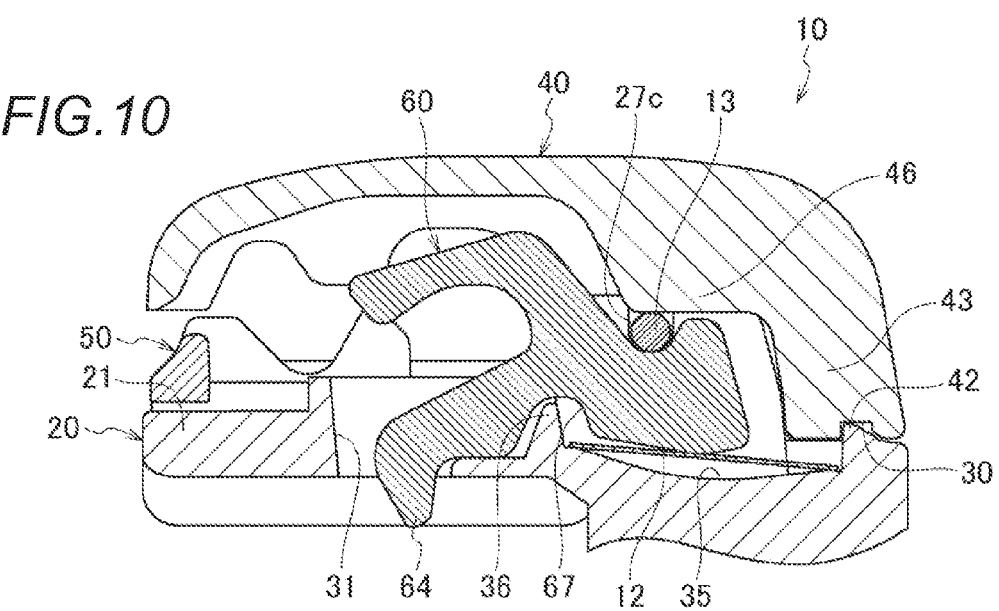
FIG. 10 is a sectional view showing a main part of a slider for slide fastener of a third variant.

That is, as shown in FIG. 10, in a slider 10 for slide fastener according to a third variant, the protrusion portion 42 is formed on the front end portion of the slider body 20 and the recess portion 30 to be engaged with the protrusion portion 42 is formed in a lower surface of the fixed base end portion 43 of the pull tab holder body 40. In this case, also, by engaging the protrusion portion 42 with the recess portion 30, the pull tab holder body 40 and the slider body 20 can be fixed to each other in the forward and rearward direction, thereby enhancing attachment strength.

Figure 11:
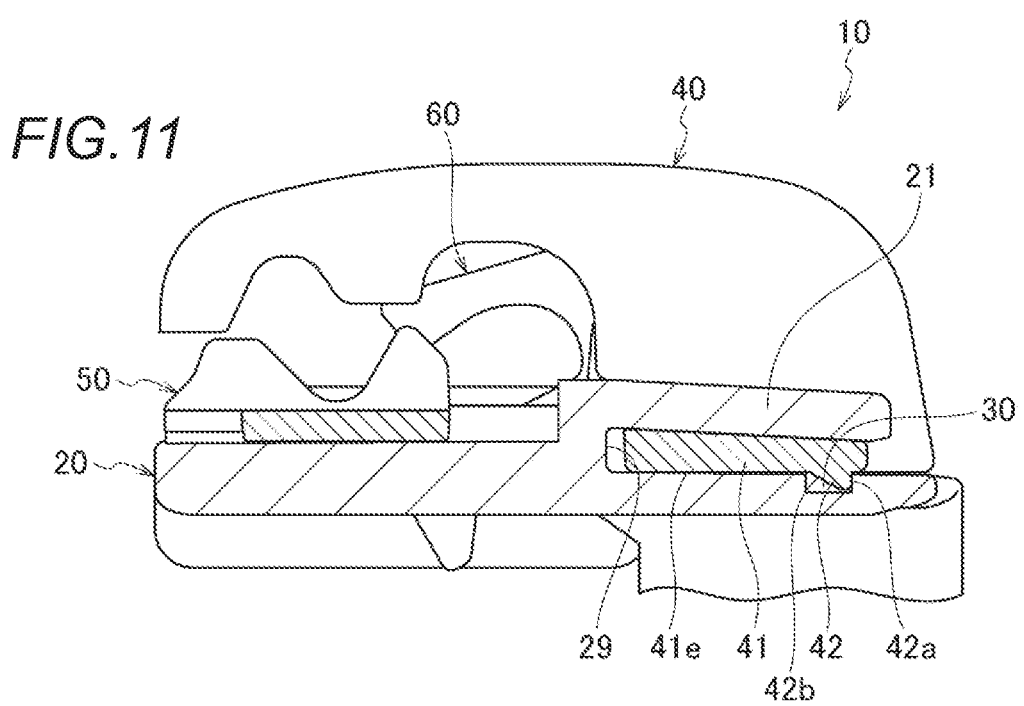
FIG. 11 is a sectional view showing a main part of a slider for slide fastener of a fourth variant, corresponding to FIG. 7C.

Alternatively, as shown in FIG. 11, in a slider 10 for slide fastener according to a fourth variant, protrusion portions 42 of the pull tab holder body 40 are formed to protrude from lower surfaces 41e of both right and left flanges 41. Also, recess portions 30 to be engaged with the protrusion portions 42 are provided in both right and left slide groove portions 29. A pair of protrusion portions 42 of the pull tab holder body 40 and a pair of recess portions 30 of the slider body 20 are engaged with each other and also the right and left flanges 41 of the pull tab holder body 40 are received in both slide groove portions 29 and then crimped on the upper blade 21, so that the pull tab holder body 40 is fixed to the slider body 20. In this case, also, by engaging the protrusion portions 42 with the recess portions 30, the pull tab holder body 40 and the slider body 20 can be fixed to each other in the forward and rearward direction, thereby enhancing attachment strength.

Figure 12:
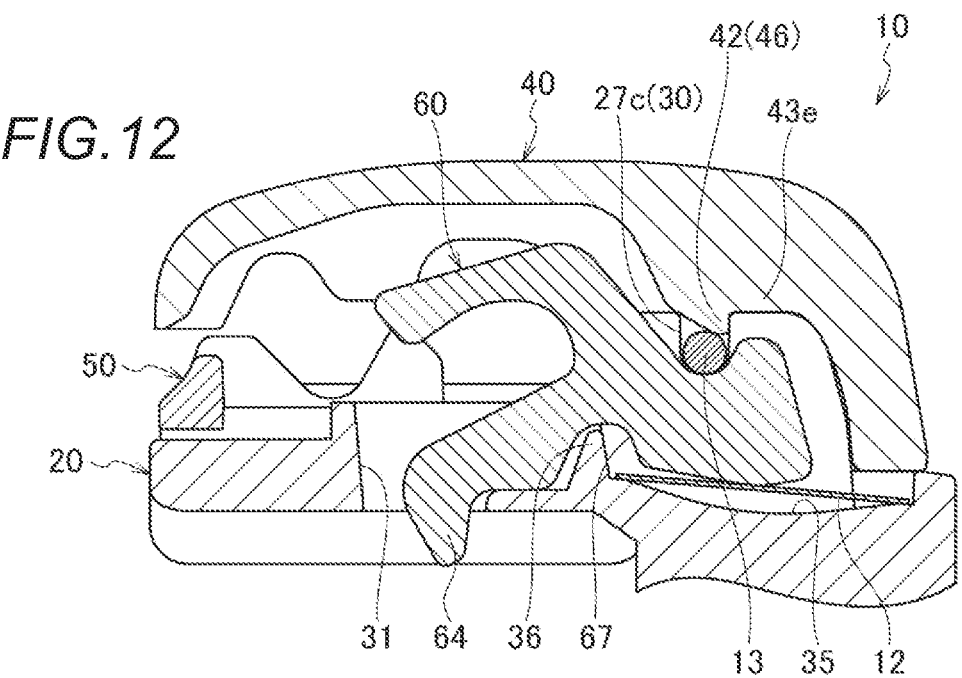
FIG. 12 is a sectional view showing a main part of a slider for slide fastener of a fifth variant, corresponding to FIG. 6B.

Also, as shown in FIG. 12, in a slider 10 for slide fastener according to a fifth variant, the step portion 46, which protrudes downward form the lower surface of the bulged portion 43e of the pull tab holder body 40, has a widthwise length allowing the step portion 46 to be engaged with the U-shaped grooves 27c of the slider body 20, which hold both ends of the pivot pin 13, and thus constitutes a protrusion portion 42. Thus, the step portion 46 presses the pivot pin 13, which pivotally supports the stop claw body 60, from the upper side thereof and also is engaged with the U-shaped grooves 27c of the slider body 20. Namely, the U-shaped grooves 27c have a function as the recess portion 30 as well as a function of holding the pivot pin 13 described in the first embodiment. In this case, also, by engaging the step portion 46 as the protrusion portion 42 with the U-shaped grooves 27c as the recess portion 30, the pull tab holder body 40 and the slider body 20 can be fixed to each other in the forward and rearward direction, thereby enhancing attachment strength.

Also, in the foregoing embodiment, the upper surfaces 41a of the flanges 41 are entirely inclined along the width direction thereof so that the thickness t of the flanges 41 is gradually decreased from the base portions 41f of the flanges 41 toward the side surfaces 41b, and also the upper surfaces 29a of the slide groove portions 29 of the slider body 20 are entirely inclined along the width direction thereof so that the thickness ta of the upper surface portions 21b of the upper blade 21, which are located above the slide groove portions 29, is gradually decreased from the base portions 21c of the upper surface portions 21b toward the side surfaces 21d. However, the present invention is not limited to that, and accordingly as in a sixth variant shown in FIGS. 13A to 13F, the upper surfaces 41a of the flanges 41 may be partially inclined along the width direction thereof so that the thickness t of the flanges 41 is gradually decreased from the base portions 41f of the flanges 41 toward the side surfaces 41b, and also the upper surfaces 29a of the slide groove portions 29 of the slider body 20 may be partially inclined along the width direction thereof so that the thickness ta of the upper surface portions 21b of the upper blade 21, which are located above the slide groove portions 29, is gradually decreased from the base portions 21c of the upper surface portions 21b toward the side surfaces 21d.

Figure 13A:
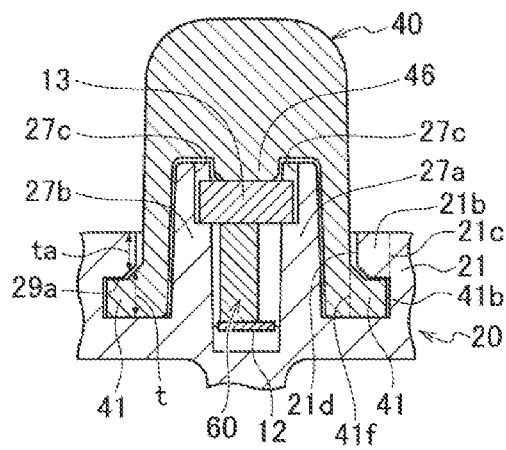
FIGS. 13A to 13F are sectional views of a main part taken along the line C-C in FIG. 2, showing first to sixth examples of a slider for slide fastener of a sixth variant.

That is, in FIG. 13A, the upper surfaces 41a of the flanges 41 have, on the vicinities of the base portions 41f of the flanges 41, inclined surfaces which are configured so that the thickness t of the flanges 41 is gradually decreased from the base portions 41f of the flanges 41 toward the side surfaces 41b. Also, the upper surfaces 29a of the slide groove portions 29 of the slider body 20 have, on the vicinities of the side surfaces 21d of the upper surface portions 21b, inclined surfaces which are configured so that the thickness ta of the upper surface portions 21b of the upper blade 21, which are located above the slide groove portions 29, is gradually decreased from the base portions 21c of the upper surface portions 21b toward the side surfaces 21d.

Figure 13D:
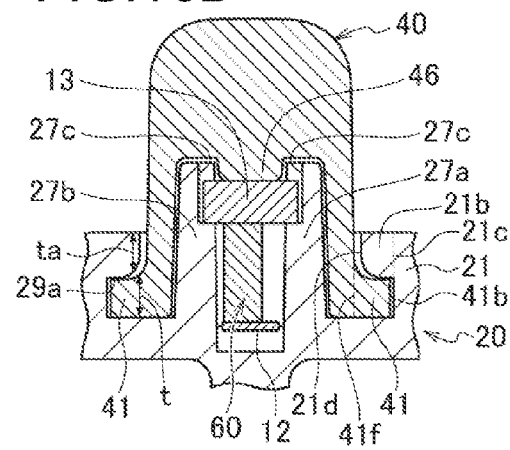
Figure 13B:
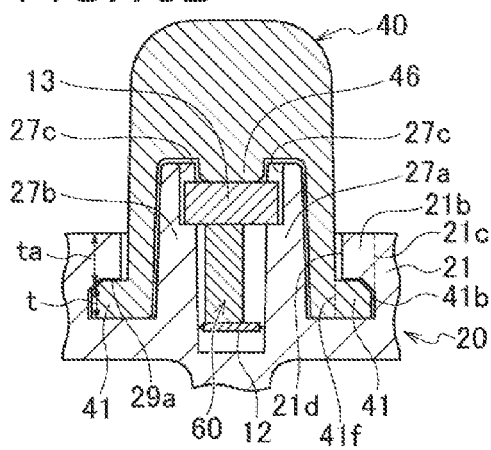

Further, in FIG. 13B, the upper surfaces 41a of the flanges 41 have, on the vicinities of the base portions 41f of the flanges 41, curved surfaces which are configured so that the thickness t of the flanges 41 is gradually decreased from the base portions 41f of the flanges 41 toward the side surfaces 41b. Also, the upper surfaces 29a of the slide groove portions 29 of the slider body 20 have, on the vicinities of the side surfaces 21d of the upper surface portions 21b, curved surfaces which are configured so that the thickness ta of the upper surface portions 21b of the upper blade 21, which are located above the slide groove portions 29, is gradually decreased from the base portions 21c of the upper surface portions 21b toward the side surfaces 21d.

Figure 13E:
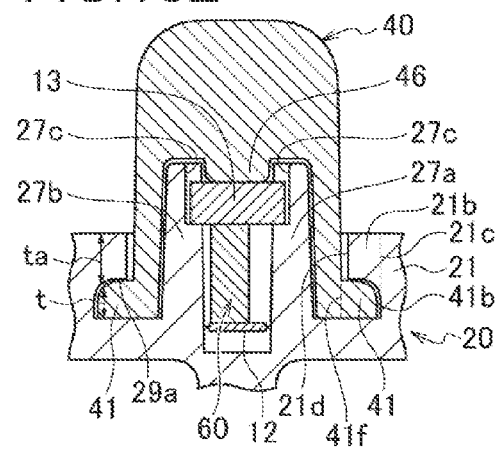
Figure 13C:
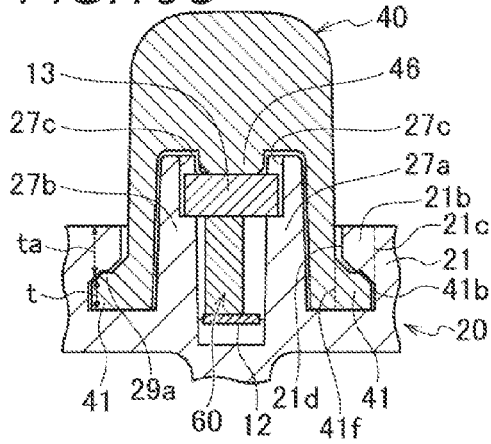
Figure 13F:
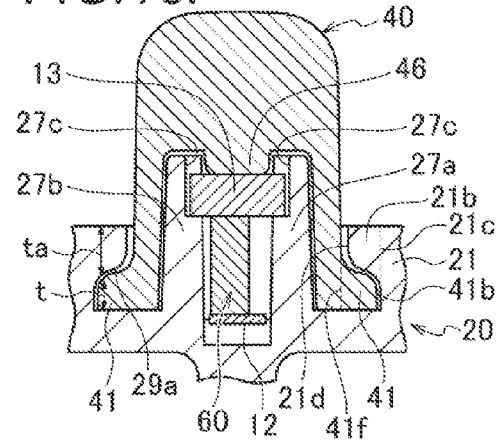

Further, in FIG. 13C, the upper surfaces 41a of the flanges 41 have, on the vicinities of the side surfaces 41b of the flanges 41, inclined surfaces which are configured so that the thickness t of the flanges 41 is gradually decreased from the base portions 41f of the flanges 41 toward the side surfaces 41b. Also, the upper surfaces 29a of the slide groove portions 29 of the slider body 20 have, on the vicinities of the base portions 21c of the upper surface portions 21b, inclined surfaces which are configured so that the thickness ta of the upper surface portions 21b of the upper blade 21, which are located above the slide groove portions 29, is gradually decreased from the base portions 21c of the upper surface portions 21b toward the side surfaces 21d.

Further, in FIG. 13D, the upper surfaces 41a of the flanges 41 have, on the vicinities of the side surfaces 41b of the flanges 41, curved surfaces which are configured so that the thickness t of the flanges 41 is gradually decreased from the base portions 41f of the flanges 41 toward the side surfaces 41b. Also, the upper surfaces 29a of the slide groove portions 29 of the slider body 20 have, on the vicinities of the base portions 21c of the upper surface portions 21b, curved surfaces which are configured so that the thickness ta of the upper surface portions 21b of the upper blade 21, which are located above the slide groove portions 29, is gradually decreased from the base portions 21c of the upper surface portions 21b toward the side surfaces 21d.

In addition, in FIG. 13E, the upper surfaces 41a of the flanges 41 have, on the vicinities of the base portions 41f and the side surfaces 41b of the flanges 41, inclined surfaces which are configured so that the thickness t of the flanges 41 is gradually decreased from the base portions 41f of the flanges 41 toward the side surfaces 41b. Also, the upper surfaces 29a of the slide groove portions 29 of the slider body 20 have, on the vicinities of the side surfaces 21d and the base portions 21c of the upper surface portions 21b, inclined surfaces which are configured so that the thickness ta of the upper surface portions 21b of the upper blade 21, which are located above the slide groove portions 29, is gradually decreased from the base portions 21c of the upper surface portions 21b toward the side surfaces 21d.

Also, in FIG. 13D, the upper surfaces 41a of the flanges 41 have, on the vicinities of the base portions 41f and the side surfaces 41b of the flanges 41, curved surfaces which are configured so that the thickness t of the flanges 41 is gradually decreased from the base portions 41f of the flanges 41 toward the side surfaces 41b. Also, the upper surfaces 29a of the slide groove portions 29 of the slider body 20 have, on the vicinities of the side surfaces 21d and the base portions 21c of the upper surface portions 21b, curved surfaces which are configured so that the thickness to of the upper surface portions 21b of the upper blade 21, which are located above the slide groove portions 29, is gradually decreased from the base portions 21c of the upper surface portions 21b toward the side surfaces 21d.

Figure 14:
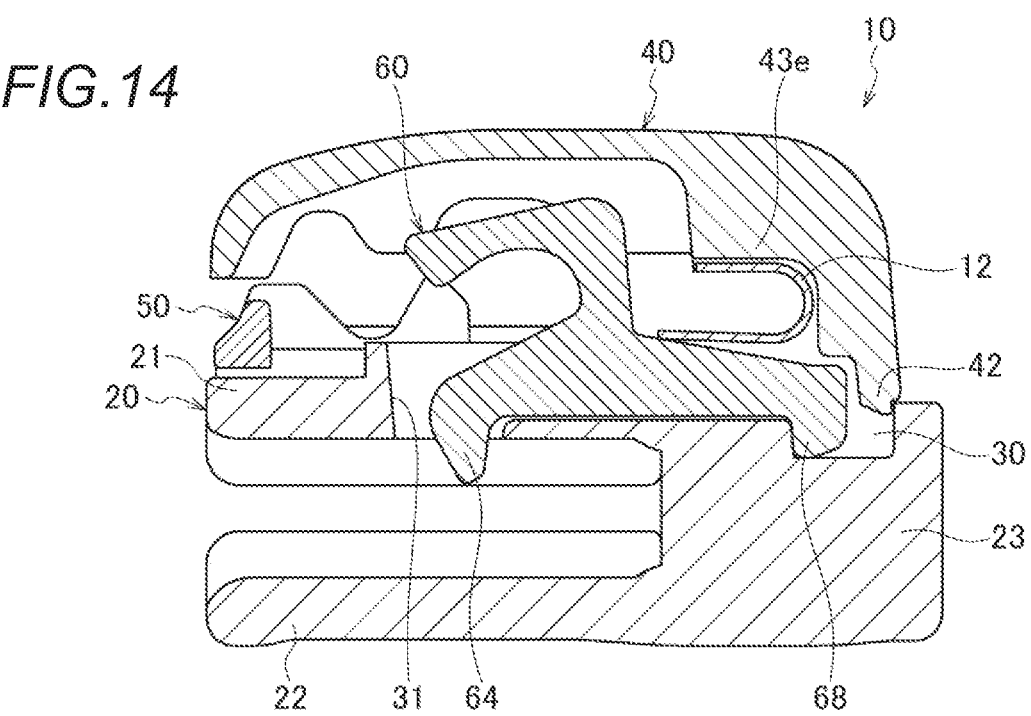
FIG. 14 is a sectional view showing a main part of a slider for slide fastener of a seventh variant.

Also, the present invention may be designed in any manners with respect to the other structures and shapes so long as the pull tab holder body 40 has flanges 40, the slider body 20 has slide groove portions 29, one of the pull tab holder body 40 and the slider body 20 has a protrusion and the other has a recess portion to be engaged with the protrusion. For example, as shown in FIG. 14, a slider 10 for slide fastener according to a seventh variant is configured so that instead of the pivot pin 13 as in the foregoing embodiment, a stop claw body 60 is swung about one end portion 68 thereof, as a fulcrum, which is supported on a recess portion 30, and a curved leaf spring 12 is arranged between an upper surface of the stop claw body 60 and a lower surface of a bulged portion 43e of the pull tab holder body 40.

Also, although in the foregoing embodiment, a slider for slide fastener of a pull tab post-attaching type having an automatic stop function has been described, the present invention is not limited to that.

Figure 15:
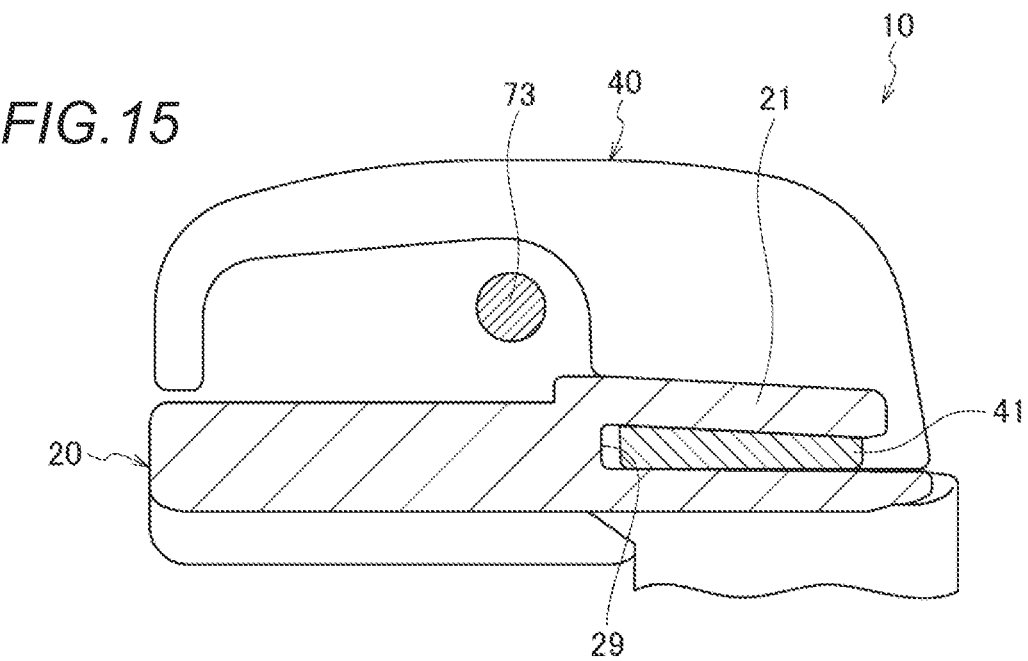
FIG. 15 is a sectional view showing a main part of a slider for slide fastener of a eighth variant.

That is, as shown in FIG. 15, a slider 10 for slide fastener according to an eighth variant is configured so that the opening and closing member 50 intended to construct the pull tab post-attaching type or the stop claw body 60 intended to impart the automatic stop function is not provided. The present invention can be applied to such a slider 10 for slide fastener. Specifically, flanges 41 of the pull tab holder body 40 are inserted into slide grooves 29 of the slider body, and at the same time, an attachment shaft portion 73 of the pull tab 70 is incorporated between the pull tab holder body 40 and the upper blade 21 of the slider body 20. Then, the upper surfaces portions 21b of the upper blade 21, which are located above the slide groove portions 29, are crimped so that the pull tab holder body 40 and the slider body 20 are fixed to each other.

The other configurations and effects are the same as those of the slider for slide fastener according to the foregoing embodiment.

DESCRIPTION OF REFERENCE NUMERALS

10 Slider for Slide Fastener
13 Pivot Pin
20 Slider Body
21 Upper Blade
22 Lower Blade
24 Element Guide Passage
27c U-Shaped Groove (Support Groove)
29 Slide Groove Portion
30 Recess Portion
31 Claw Hole
40 Pull Tab Holder Body
41 Flange
41a Upper Surface
41b Side Surface
41c Rear End Portion
41d Front End Portion
41e Lower Surface
42 Protrusion Portion
43 Fixed Base End Portion (One End Portion)
46 Step Portion
60 Stop Claw Body
64 Claw Portion
70 Pull Tab
73 Attachment Shaft Portion
t Thickness
W Width

The invention claimed is:
1. A slider for slide fastener, comprising:
a slider body having an upper blade and a lower blade arranged to face each other in an upward and downward direction and provided with an element guide passage between the upper blade and the lower blade;
a pull tab having an attachment shaft portion; and
a pull tab holder body fixed, at one end portion thereof, to the upper blade of the slider body in cantilevered fashion and configured to hold the attachment shaft portion of the pull tab,
wherein the pull tab holder body comprises flanges extending from right and left side surfaces of the one end portion in a width direction and extending in a longitudinal direction,
wherein the slider body comprises slide groove portions formed in a front end portion of the upper blade and configured to receive the flanges,
wherein one of the pull tab holder body and the slider body has a protrusion portion protruding toward the other of the pull tab holder body and the slider body;
wherein the other of the pull tab holder body and the slider body has a recess portion to be engaged with the protrusion portion, and
wherein the flanges are inserted into the slide groove portions and upper surface portions of the upper blade located above the slide groove portions are crimped toward the flanges, so that the protrusion portion is engaged with the recess portion and the pull tab holder body is fixed to the slider body.

2. The slider for slide fastener according to claim 1, wherein upper surfaces of the flanges are inclined surfaces which are inclined so that a thickness of each of the flanges is gradually decreased from rear end portions of the flanges toward front end portions thereof.

3. The slider for slide fastener according to claim 1,
wherein upper surfaces of the flanges are formed so that a thickness of each of the flanges is gradually decreased from base portions of the flanges toward side surfaces thereof, and
wherein upper surfaces of the slide groove portions of the slider body are formed to correspond to the upper surfaces of the flanges so that a thickness of each of the upper surface portions of the upper blade, which are located above the slide groove portions, is gradually decreased from base portions of the upper surface portions toward side surfaces thereof.

4. The slider for slide fastener according to claim 1, wherein side surfaces of the flanges are inclined so that a width of each of the flanges is gradually widened from rear end portions of the flanges toward the front end portions thereof.

5. The slider for slide fastener according to claim 1,
wherein the protrusion portion is formed to protrude from a lower surface of the one end portion of the pull tab holder body toward the slider body, and
wherein the recess portion is formed in an upper surface of the front end portion of the upper blade.

6. The slider for slide fastener according to claim 1,
wherein the protrusion portion is formed to protrude from an upper surface of the front end portion of the upper blade toward the pull tab holder body, and
wherein the recess portion is formed in a lower surface of the one end portion of the pull tab holder body.

7. The slider for slide fastener according to claim 1,
wherein the protrusion portion is formed on lower surfaces of the flanges of the pull tab holder body, and
wherein the recess portion is formed in lower surfaces of the slide groove portions.

8. The slider for slide fastener according to claim 1, further comprising:
a stop claw body arranged in an upward and downward swingable manner by a claw body support portion which is erected from the upper blade, and having a claw portion capable of retractably protruding to the element guide passage through a claw hole formed in the upper blade; and
a pivot pin having both ends held in support grooves formed in the claw body support portion and configured to pivotally support the stop claw body,
wherein the protrusion portion is a step portion formed to protrude downward from a lower surface of an inner wall and configured to be abutted against the pivot pin, and
wherein the recess portion is the support grooves configured to hold the both ends of the pivot pin and to be engaged with the step portion.

* * * * *

UNITED STATES PATENT AND TRADEMARK OFFICE
CERTIFICATE OF CORRECTION

PATENT NO. : 9,254,020 B2  
APPLICATION NO. : 14/647258  
DATED : February 9, 2016  
INVENTOR(S) : Yohei Miyazaki Page 1 of 1

It is certified that error appears in the above-identified patent and that said Letters Patent is hereby corrected as shown below:

In the Specification

In column 2, line 40, after "thereof" insert -- . --.

In column 2, line 55, after "thereof" insert -- . --.

In column 5, line 14, delete "ployacetal" and insert -- polyacetal --, therefor.

In column 5, line 27, after "thereof" insert -- . --.

In the Claims

In column 16, line 24, in claim 8, after "wall" insert -- of the pull tab holder body --.

Signed and Sealed this  
Third Day of May, 2016

Michelle K. Lee  
*Director of the United States Patent and Trademark Office*